United States Patent [19]

Rauser et al.

[11] Patent Number: 4,569,551
[45] Date of Patent: Feb. 11, 1986

[54] PANEL MEMBER FOR AN UNDERSIDE OF AN AUTOMOTIVE VEHICLE, ESPECIALLY A PASSENGER CAR

[75] Inventors: Michael Rauser, Kornwestheim; Sven Lange, Rutesheim; Norbert Singer, Vaihingen, all of Fed. Rep. of Germany

[73] Assignee: Dr. Ing. h.c.F. Porsche Aktiengesellschaft, Weissach, Fed. Rep. of Germany

[21] Appl. No.: 616,494

[22] Filed: Jun. 1, 1984

[30] Foreign Application Priority Data

Jun. 10, 1983 [DE] Fed. Rep. of Germany ....... 3320987

[51] Int. Cl.⁴ ............................................. B62D 35/00
[52] U.S. Cl. ...................... 296/1 S; 296/204; 296/185
[58] Field of Search ..................... 296/1 S, 185, 204

[56] References Cited

U.S. PATENT DOCUMENTS 2,955,869 10/1960 Blaser ................................. 296/1 S
3,776,587 12/1973 Oxlade ............................... 296/1 S
4,049,309 9/1977 Seal ..................................... 296/1 S
4,474,401 10/1984 Amick ................................ 296/1 S

FOREIGN PATENT DOCUMENTS 3150952 6/1983 Fed. Rep. of Germany ...... 296/1 S

Primary Examiner—Robert R. Song
Attorney, Agent, or Firm—Barnes & Thornburg

[57] ABSTRACT

A panel member is disclosed for an automotive vehicle. The panel member is disposed on the underside of the vehicle in a spaced relation to the roadway and includes a first constricted portion in front of the front wheel, and a second constricted portion behind the rear wheel. The constricted portions provide first and second constricted spaces between the panel member and the roadway. The panel member also includes boundary element portions which are disposed along the longitudinal sides of the panel member, generally between the front and rear wheels of the vehicle. The boundary element portions cooperate with the panel member to form an air duct. The panel member is formed to provide an essentially smooth surface and to cover parts of the chassis such as axles, control arms, or the like.

17 Claims, 4 Drawing Figures

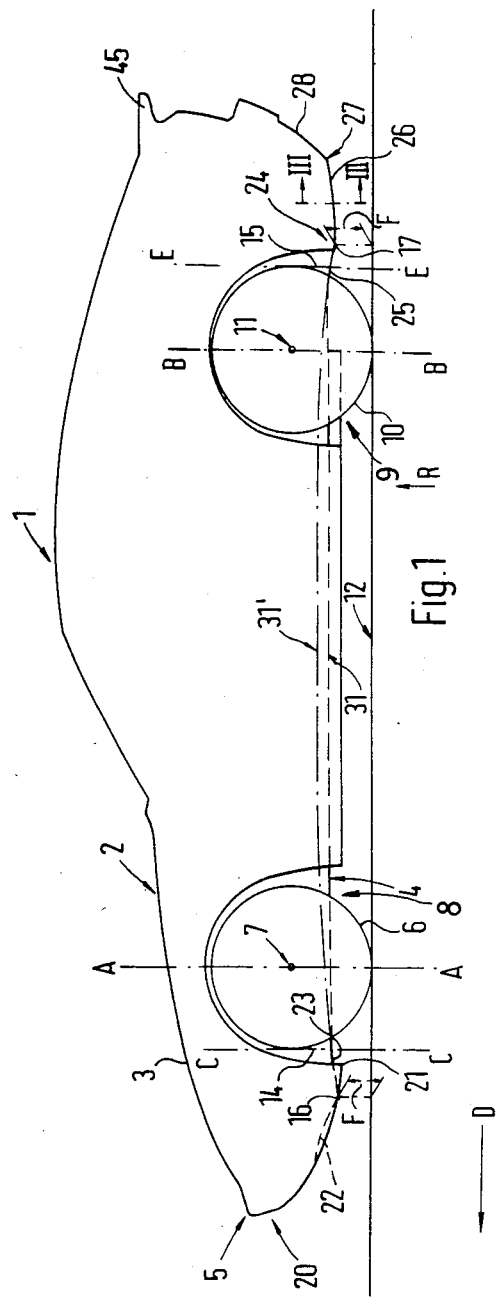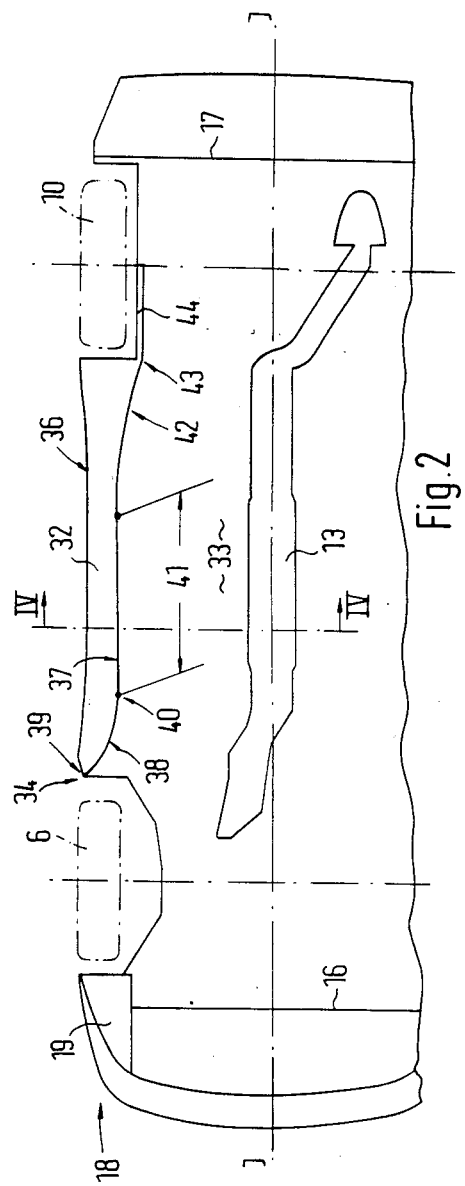

PANEL MEMBER FOR AN UNDERSIDE OF AN AUTOMOTIVE VEHICLE, ESPECIALLY A PASSENGER CAR

BACKGROUND AND SUMMARY OF THE INVENTION

The present invention relates to a panel member for the underside of a vehicle, and more particularly to a panel member for the underside of a passenger car.

Panel members typically are fitted along the underside of an automobile and held in a spaced relation from the ground, or roadway, by the wheels of the vehicle. A panel member can have an aerodynamically designed shape in certain areas and can include one or more constricted portions. As used herein, a constricted portion relates to a portion of the panel member which extends downwardly from the underside of the panel member, relative to other portions of the panel member. A downwardly extending constricted portion thus forms a constricted space between the ground and the underside of the vehicle, relative to other portions of the panel member.

One conventional panel member is described in U.S. Pat. No. 3,776,587. This panel member includes one convex curved portion which is disposed behind the front axle and another convex curved portion disposed in the general vicinity of the rear axle. These convex curved portions form venturi pipe-like constrictions between the panel member and the ground or roadway. Experiments have shown that the placement of a constricted portion behind the front axle adversely affects the drag coefficient and the negative lift at the front axle. Additionally, it has been found that a constricted portion underneath the rear axle of a vehicle causes a positive lift which can substantially impair driving safety.

It is an object of the present invention to provide a panel member for the underside of an automotive vehicle which improves the drag coefficient of the vehicle and provides good negative lift at the front and rear axles. By providing good negative lift at the front and rear axles, the road-hugging ability of the car is enhanced.

In accordance with the instant invention, a panel member arrangement is provided for a motor vehicle having an upper side, an underside, front wheels, and rear wheels. The panel member arrangement comprises a panel member which can be disposed on the underside of the vehicle to cover parts of the chassis such as the axles, and which can be supported by the motor vehicle's wheels above the ground in a spaced relation to the ground. The panel member includes a central portion and a first constricted portion. The first constricted portion is disposed in front of the front wheels of the motor vehicle, and provides a first constricted space between the panel member and the ground. The second constricted portion is disposed behind the rear wheels of the vehicle to provide a second constricted space between the panel member and the ground. First and second boundary element portions are disposed along the sides of the panel member for forming an air duct with the central portion.

Preferably, the panel member includes first and second front wheel cut-out portions and first and second concavely shaped ascending ramp portions. The ascending ramp portions are disposed along the sides of the panel member in front of the front wheel cut-out portions. The ascending ramp portions each include a forward portion adjacent the front of the panel member and a rearward portion. The rearward portions are disposed adjacent the respective front wheel cut-out portions, and are generally as wide as the front wheels of the vehicle. The ascending ramp portions each extend downwardly and rearwardly from the front of the panel member to the respective front wheel cut-out portions.

One advantage of the present invention is that the drag coefficient of the vehicle is substantially improved due to the arrangement and configuration of the constricted portions, the contoured section of the smooth-surfaced panel member and the air ducts. This improvement is effected while retaining a negative lift which enhances the road-hugging ability of the vehicle.

One advantageous feature of certain preferred embodiments of the present invention is that a concave leading section is provided in front of the first constricted portion. This feature has the advantage of directing an air stream to the first constricted portion in a controlled fashion.

It is also an advantageous feature of certain preferred embodiments of the present invention that convex ascending ramps are provided in front of the front wheels of the vehicle. The convex ascending ramps have the advantage of conducting the air flow past the front wheels.

Another advantageous feature of certain preferred embodiments of the present invention is that the first constricted portion is provided with a concave trailing section. This feature has the advantage of effecting a reduction in air resistance and promotes good negative lift at the front axle according to the venturi principle.

One advantageous aspect of the present invention is that boundary element portions are provided which extend along the sides of the panel members between the front and rear wheels. The boundary element portions effect the channeling of the air flow in the bottom panel zones, and help to avoid eddies between the wheels. These eddies tend to raise air resistance, and hence increase the drag coefficient of the vehicle. Additionally, these boundary elements prevent the influx of air into the vacuum region underneath the vehicle. Preferably, the boundary elements are each provided with a rounded leading section and a rounded trailing section. The rounded leading and trailing sections produce an improved air flow in the bottom panel regions and serve to guide the air flow past the rear wheels to lower the incidences of eddies.

In a preferred embodiment of the present invention, the second constricted portion is provided with a concave leading section and a convex trailing section. The concave leading section provides a negative lift at the rear axle, according to the venturi principle. The convex trailing section includes a rounded transition portion which provides a smooth transition between the generally horizontal panel member and a vertically oriented side wall of the vehicle, to provide good conductance of air toward the side of the vehicle. The convex trailing section also includes a sharp-edged transition portion between the trailing section and the rear end wall of the vehicle. This sharp-edged transition portion acts as a breakaway rim for air flow at the rear of the vehicle.

The trailing section behind the second constricted portion cooperates with a rear spoiler, which is disposed in the upper zone of the automotive vehicle, to provide a negative lift at the rear axle which is greater than the negative lift at the front axle. This greater negative lift at the rear axle increases driving safety by providing a slightly understeering driving characteristic to the vehicle at higher speeds.

Additionally, the panel member can include a countersunk duct for receiving the exhaust pipe of the vehicle. This hidden arrangement of the exhaust pipe in the duct reduces turbulence in the air flow along the underside of the vehicle.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIG. 1 is a lateral schematic part-sectional view of an automotive vehicle including the lower panel member arrangement constructed in accordance with the present invention;

FIG. 2 is a partial, bottom view of the vehicle taken generally in the direction of arrow R of FIG. 1;

DETAILED DESCRIPTION OF THE DRAWINGS

Figure 3:
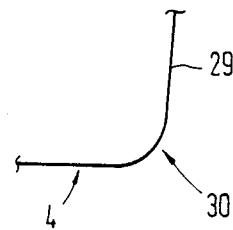
FIG. 3 is a sectional view taken along lines III—III of FIG. 1.

An automotive vehicle, such as a passenger car 1, is shown in the figures. The vehicle 1 includes a body 2 having an upper panel member 3, a lower panel member 4 and an aerodynamically favorably designed front end 5. The centers 7 of the vehicle's front wheels 6 lie on a perpendicularly extending front axle plane A—A. The panel member 4 includes front wheel cut-out portions 8 cut-out along the boundary of the front wheel well which are positioned to receive front wheels 6 and rear wheel cut-out portions 9 cut-out along the boundary of the rear wheel well which are provided for receiving the rear wheels 10. The centers 11 of the rear wheels 10 lie on a perpendicularly extending rear axle plane B—B.

The panel member 4 is disposed on the underside of the vehicle body 1 and is supported with the rest of the vehicle body by the motor vehicle's wheels 6 and 10 in a spaced relation above the ground or roadway 12. The panel member 4 is designed to have a smooth surface. The smooth surface of the panel member 4 helps to avoid air turbulences, which can increase air resistance on the underside of the vehicle 1. The panel member 4 can be made as a separate part which is subsequently attached to the underside of the vehicle. Alternatively, the panel member 4 can be integrally formed as a part of the bottom of the vehicle 1. The panel member 4 extends generally over the entire underside of the vehicle 1 and serves to cover parts of the vehicle, such as axles, control arms, shock absorbers and other chassis parts, and the like which are disposed above the panel member 4.

The panel member 4 includes a countersunk duct 13 which is positioned for the hidden accommodation of an exhaust pipe (not shown in detail) which is operatively coupled to an internal combustion engine disposed in an engine compartment at the front end of the vehicle 1.

As best shown in FIG. 1, the panel member 4 includes first (front) 16 and second (rear) 17 venturi-pipe-like constricted portions. The first constricted portion 16 is provided in front of the front wheel 6, and the second constricted portion is provided behind the rear wheel 10. Both constricted portions 16 and 17 provide a constricted space between the panel member 4 and the roadway 12. The first constricted portion 16 is disposed adjacent to a vertical auxiliary plane C—C which extends transversely to the longitudinal axis of the vehicle. Plane C—C is positioned to be tangential to the vehicle's front wheels 6 at their forwardmost points 14. As shown in FIG. 1, the front constricted portion 16 is preferably provided in front of this auxiliary plane C—C.

First and second convexly shaped ascending ramps 19 are provided along the longitudinal sides 18 of the panel member 4 in front of the front wheel cut-out portions 8, and hence, in front of the front wheels 6 of vehicle 1. Each ascending ramp portion 19 extends from a higher level front end zone 20 at the forward portion of the ramp 19, downwardly and rearwardly to its rearward portion at the forward boundary edge 21 of its respective front wheel cut-out 8. The rearward portions of the ascending ramps 19 adjacent the front wheel cut-out portions 8 are generally at least as wide as the front wheels 6 of the vehicle. The ascending ramps 19 are provided to conduct the on-flowing air past the front wheels 6. The front constricted portion 16 is disposed between the ascending ramp portions 19 at opponents sides of the vehicle.

The panel member 4 includes a concave contour section 22 which is disposed in front of the front constriction 16 and between the ascending ramps 19. The concave contour section 22 provides a kind of trough in the forward part of the vehicle which conducts the air to the front constricted portion 16 in a controlled fashion. A concave trailing section 23 is disposed behind the front constricted portion 16, and extends rearwardly, generally to the front axle plane A—A.

The rear constricted portion 17 is preferably disposed in a zone 24 which is at or behind the vertical auxiliary plane E—E. Vertical auxiliary plane E—E is a vertical plane disposed tangentially to the rearwardmost points 15 of the rear wheels 10 of the vehicle 1. Although the second constricted portion 17 can be disposed as far forwardly as plane E—E, the rear constricted portion 17 is preferably disposed therebehind, as shown in FIG. 1. A concave leading section 25 is provided in front of the second constricted portion 17, and a convex trailing section 26 is disposed behind the second constricted portion 17. The convex trailing section 26 extends rearwardly to a rear end section 28, forming a sharp breakaway rim 27 at its intersection with the rear end section 28.

A generally rounded transition portion 30 is located between the generally horizontally extending panel member 4 and a generally vertically oriented lateral member 29 (FIG. 3) of the side of the vehicle 1. Transition portion 30 is provided to conduct air away from the panel member 4 toward the side of the vehicle 1, and away from the vehicle 1.

The first constricted portion 16 and second constricted portion 17 are designed, when the panel member 4 is mounted to the vehicle 1, to be spaced from the ground 12 by a distance F. As best shown in FIG. 1, the distance F between the first constricted portion 16 and the ground 12 is generally equal to the distance between the second constricted portion 17 and the ground 12. Distance F is also less than distance H, the distance between the central section 35 and the ground 12.

Contoured section 31 extends between the first constricted portion 16 and the second constricted portion 17. In the portion of the panel member 4 between the front axle plane A—A and the rear axle plane B—B, the contoured section 31 extends generally linearly and generally parallel to the ground or roadway 12. The contoured section 31 is connected, at its front part to the forward trailing section 23, and is connected at its rear part to the rearward leading section 25. In another embodiment of the present invention, the contoured section 31 can exhibit a continuously concave configuration (as shown in phantom line 31' of FIG. 1) from the first constricted portion 16 to the second constricted portion 17.

The panel member 4 includes first and second boundary element portions 32 which are disposed along the longitudinal sides 18, generally between the front wheels 6 and the rear wheels 10. The first boundary element portion 32 is disposed along one side of the panel member, and the second boundary element portion (not shown because it is of the same configuration as the first) is disposed along an opposite side of the panel member 4. Boundary element portions 32 are provided to avoid air turbulences which increase air resistance. The first and second boundary element portions 32 form, together with panel member 4, an air duct 33 which extends in a longitudinal vehicle direction. The air duct 33 extends from a zone 34 lying generally behind the front wheels 6, rearwardly to the rear axle plane B—B.

Figure 4:
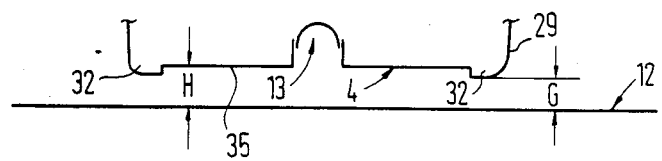
FIG. 4 is a sectional view taken along lines IV—IV of FIG. 2.

As best shown in FIG. 4, the spacing G between the lateral boundary element portions 32 and the ground 12 is less than the distance H between the interposed section 35 of the panel member 4 and the ground 12.

In the preferred illustrated embodiment, the boundary element portions 32 are formed integrally with the panel member 4. Alternatively, the boundary element portions 32 can be formed from separately manufactured components which are subsequently attached to the underside of the panel member 4 according to other preferred embodiments. The outer contour of the vehicle 1 determines the location of the side 36 of the boundary elements 32. Preferably, the vertically disposed section 29 of the boundary elements 32 is positioned to be aligned with a vertically disposed portion of the body of the motor vehicle 1.

As best shown in FIG. 2, the inner side 37 of each boundary portion 32 includes a flow-exposed section 38 which is disposed adjacent, and behind, the front wheels 6. The flow-exposed section 37 extends from an externally located zone 39, rearwardly and arcuately to an internally located zone 40. The inner side 37 also includes a generally parallel section 41 which is disposed behind the flow-exposed section 38. The generally parallel section 41 has an approximately constant cross-sectional extension along its length. The parallel section 41 extends generally parallel to a longitudinal plane of symmetry J—J of the panel member 4. An inwardly oriented, arcuate contoured section 42 adjoins the parallel section 41, and is disposed generally rearwardly thereof. The inwardly oriented arcuate contoured section 42 is provided to direct the flow of air around the rear wheels 10.

The contoured section 42 extends rearwardly from the rear portion of the parallel sections 41 approximately to the front edge 43 of the rear wheel cut-out portion 9. Behind this point 43, the boundary element 32 can continue as a narrow web 44 which terminates approximately at the rear axle plane B—B. As shown in FIG. 2, the contoured section 42 has a generally concave contour and the flow-exposed section 38 has a generally convex contour. Preferably, boundary elements 32 have a uniform spacing G with respect to the roadway 12, throughout their entire length. Alternatively, the boundary elements 32 can be formed to provide a variable distance between the portions 32 and the ground 12 over their longitudinal extension.

The vehicle 1 is preferably provided with a rear end spoiler 45 positioned on the vehicle's upper panel member 3. Spoiler 45 serves as a breakaway edge for air flowing over the vehicle 1, and helps produce a negative lift. By producing this negative lift, the rear end spoiler 45 improves the road-hugging ability of the vehicle 1.

Although the invention has been described in detail with reference to certain preferred embodiments and specific examples, variations and modifications exist within the scope and spirit of the invention as described and as defined in the following claims.

What is claimed is:

1. A vehicle panel member arrangement for the underside of an automotive vehicle such as a passenger car having front and rear wheels supporting the vehicle on a ground surface, said panel member arrangement including:

a first constricted panel member portion disposable in front of the front wheels of the vehicle and providing a first constricted space between the panel member and the ground;

a second constricted panel member portion disposable behind the rear wheels of the vehicle and providing a second constricted space between the panel member and the ground;

a central panel member portion extending between the first and second constricted panel member portions and being configured with its downwardly facing surfaces at a greater distance from the ground than the constricted panel member portion;

first and second boundary element panel member portions disposed laterally of and forming an air duct with the central portion;

first and second front wheel cut-out portions, first and second convexly shaped ascending ramp panel member portions disposed along the sides of the panel member arrangement in front of the respective first and second front wheel cut-out portions, a concavely shaped contour panel member portion disposed in front of said first constricted portion and between the ascending ramp portions, and a concavely shaped trailing panel member portion disposed behind the first constricted portion.

2. The panel member arrangement according to claim 1, wherein each ascending ramp portion includes a forward portion adjacent the front of the panel member arrangement and a rearward portion generally as wide as the respective front wheels of the vehicle, disposed adjacent its respective front wheel cut-out portion, and extending downwardly and rearwardly from the front of the panel member to its respective front wheel cut-out portion.

3. The panel member arrangement according to claim 1, wherein the first constricted portion is disposed between the ascending ramp portions.

4. The panel member arrangement according to claim 1, wherein said boundary elements are formed integrally with the adjacent panel member portion.

5. The panel member arrangement according to claim 1, further comprising a concavely shaped leading panel member portion disposed in front of the second constricted portion,
wherein the central portion is generally flat, and extends parallel to the ground between the concavely shaped trailing portion of the first constricted portion and the concavely shaped leading portion of the second constricted portion.

6. The panel member arrangement according to claim 1, wherein the central portion has a generally concave contour extending between the first constricted portion and the second constricted portion.

7. The panel member arrangement according to claim 1, further comprising a countersunk panel member portion for receiving a portion of the vehicle's exhaust system.

8. A vehicle panel member arrangement for the underside of an automotive vehicle such as a passenger car having front and rear wheels supporting the vehicle on a ground surface, said panel member arrangement including:
a first constricted panel member portion disposable in front of the front wheels of the vehicle and providing a first constricted space between the panel member and the ground;
a second constricted panel member portion disposable behind the rear wheels of the vehicle and providing a second constricted space between the panel member and the ground;
a central panel member portion extending between the first and second constricted panel member portions and being configured with its downwardly facing surfaces at a greater distance from the ground than the constricted panel member portion;
first and second boundary element panel member portions disposed laterally of and forming an air duct with the central portion;
a concavely shaped leading panel member portion disposed in front of the second constricted portion and
a convexly shaped trailing panel member portion disposed behind the second constricted portion, the trailing portion extending rearwardly to the rear end of the panel member arrangement for forming a sharp-edged breakaway rim.

9. The panel member arrangement according to claim 8, wherein the trailing portion includes a generally rounded transition portion having a generally horizontally disposed section and a generally vertically disposed section.

10. The panel member arrangement according to claim 8, wherein the transition portion includes first and second transition portions disposed on respective first and second sides of the trailing portion, each of the first and second transition portions including a generally horizontally disposed section and a generally vertically disposed section positioned alignable with a vertically disposed portion of the motor vehicle's body.

11. The panel member arrangement according to claim 8, wherein said boundary elements are formed integrally with the adjacent panel member portion.

12. The panel member arrangement according to claim 8, further comprising:
a concavely shaped trailing panel member portion disposed behind the first constricted portion, and
the central portion is generally flat, and extends parallel to the ground between the concavely shaped trailing portion of the first constricted portion and the concavely shaped leading portion of the second constricted portion.

13. The panel member arrangement according to claim 8, wherein the central portion has a generally concave contour extending between the first constricted portion and the second constricted portion.

14. The panel member arrangement according to claim 8, further comprising a countersunk panel member portion for receiving a portion of the vehicle's exhaust system.

15. A vehicle panel member arrangement for the underside of an automotive vehicle such as a passenger car having front and rear wheels supporting the vehicle on a ground surface, said panel member arrangement including:
a first constricted panel member portion disposable in front of the front wheels of the vehicle and providing a first constricted space between the panel member and the ground;
a second constricted panel member portion disposable behind the rear wheels of the vehicle and providing a second constricted space between the panel member and the ground;
a central panel member portion extending between the first and second constricted panel member portions and being configured with its downwardly facing surfaces at a greater distance from the ground than the constricted panel member portion;
first and second boundary element panel member portions disposed laterally of and forming an air duct with the central portion;
said air duct extending rearwardly to a point on the panel member arrangement corresponding generally to the center of the rear wheels of the motor vehicle; and
wherein said boundary element portions each include interior side wall portions, the interior side wall portions including,
a flow-exposed section disposed generally rearwardly of the front wheel cut-out portions and extending arcuately from an externally located zone to an internally located zone,
a parallel section disposed behind the flow-exposed section and extending generally parallel to a longitudinal axis of symmetry of the panel member arrangement,
an inwardly oriented, bent contoured section disposed generally behind the parallel section and in front of the rear cut-out portion for directing a flow of air around the rear wheels of the vehicle and
a web section disposed behind the inwardly oriented, bent contoured section.

16. The panel member arrangement according to claim 15, wherein said boundary elements are formed integrally with said panel member.

17. A vehicle panel member arrangement for the underside of an automotive vehicle such as a passenger car having front and rear wheels supporting the vehicle on a ground surface, said panel member arrangement including:

a first constricted panel member portion disposable in front of the front wheels of the vehicle and providing a first constricted space between the panel member and the ground;

a second constricted panel member portion disposable behind the rear wheels of the vehicle and providing a second constricted space between the panel member and the ground;

a central panel member portion extending between the first and second constricted panel member portions and being configured with its downwardly facing surfaces at a greater distance from the ground than the constricted panel member portion;

first and second boundary element panel member portions disposed laterally of and forming an air duct with the central portion;

wherein said boundary element portions each include interior side wall portions, the side wall portions including a flow-exposed section disposed generally rearwardly of the front wheel cut-out portion, and extending arcuately from an externally located zone to an internally located zone, a parallel section disposed generally rearwardly of the flow-exposed section and extending generally parallel to a longitudinal axis of symmetry of the panel member arrangement, a rearwardly oriented, bent contoured section disposed generally behind the parallel section and in front of the rear cut-out portion for directing a flow of air around the rear wheels of the vehicle, and a web section disposed behind the inwardly oriented, bent contoured section.

* * * * *